Nov. 10, 1970   J. A. BLACK   3,539,417
SHEET TO WEB LAMINATING MACHINE
Filed Feb. 23, 1967   5 Sheets-Sheet 1

INVENTOR.
JAMES A. BLACK
BY Price, Heneveld,
Huizenga & Cooper
ATTORNEYS

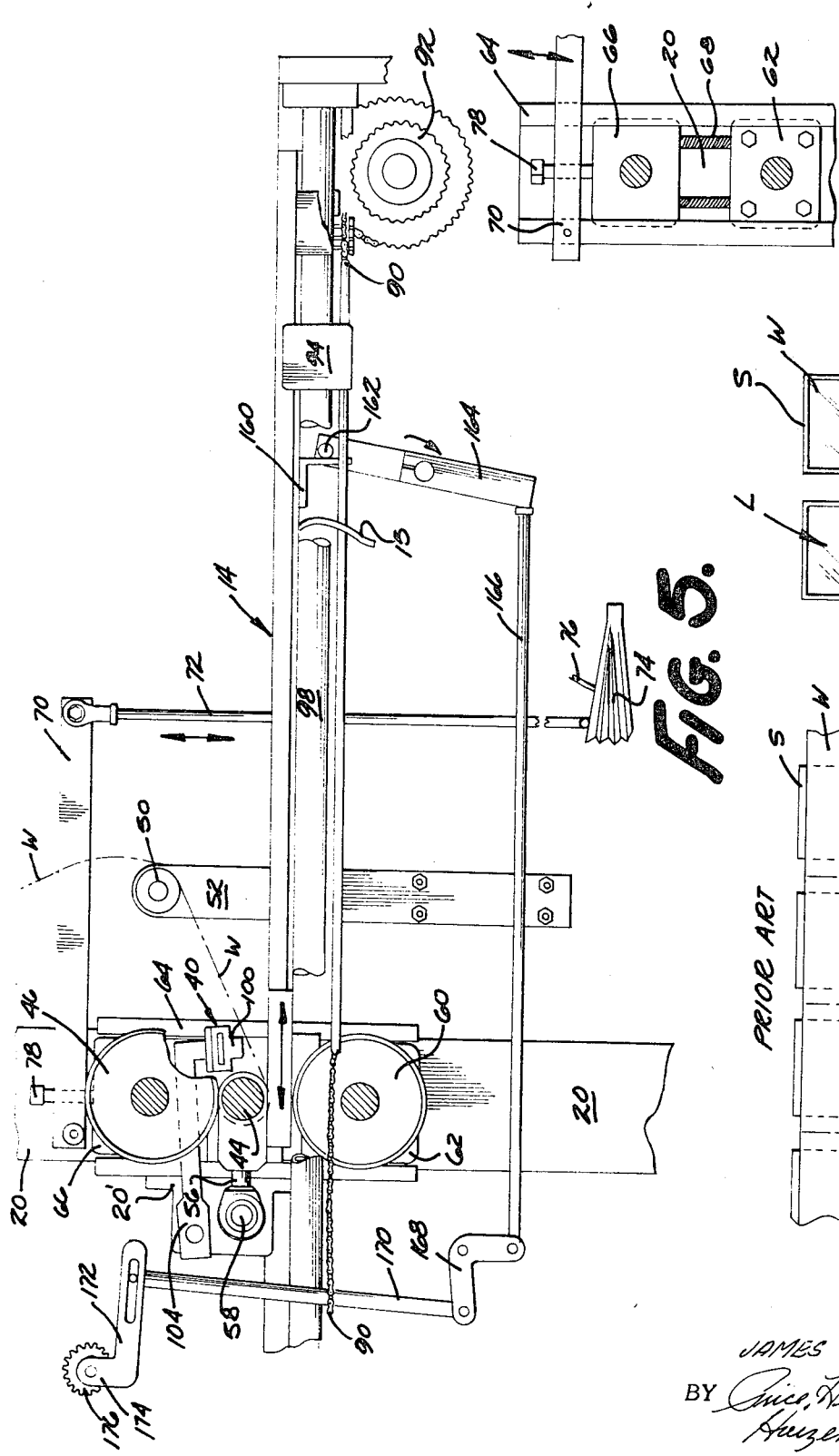

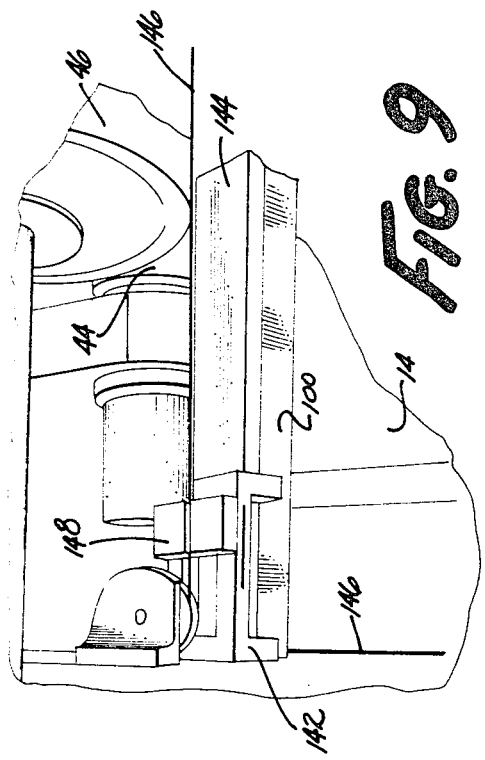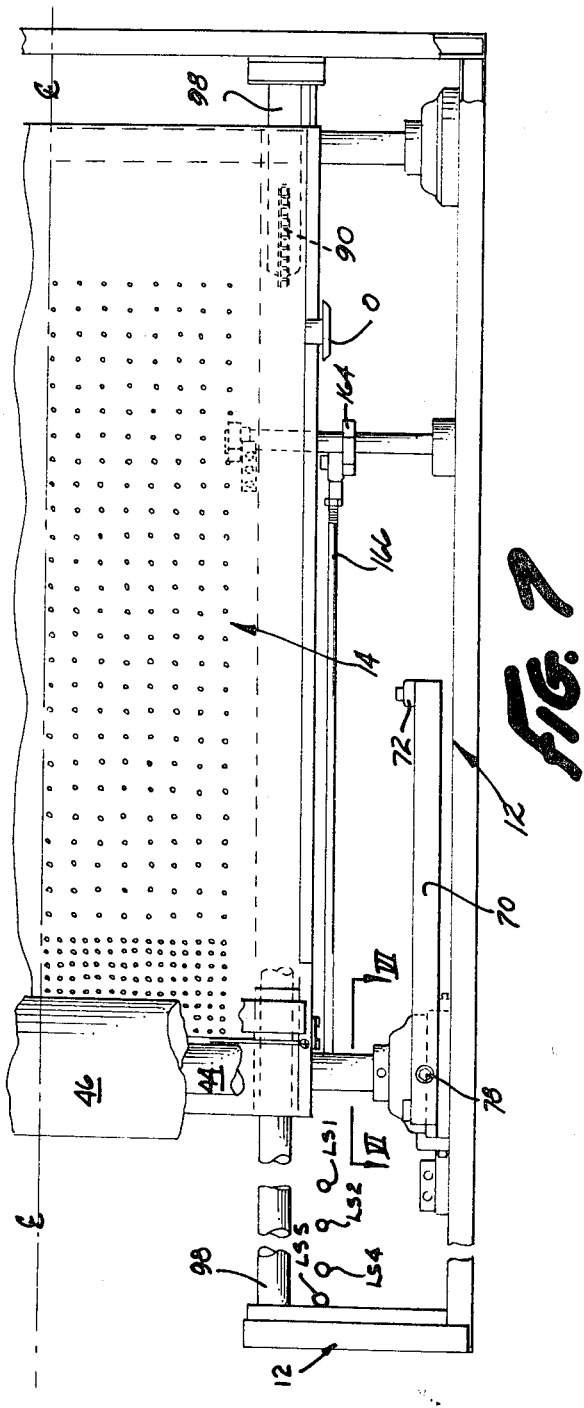

Nov. 10, 1970 J. A. BLACK 3,539,417
SHEET TO WEB LAMINATING MACHINE
Filed Feb. 23, 1967 5 Sheets-Sheet 5

INVENTOR.
JAMES A. BLACK
BY Price, Heneveld
Huizenga & Cooper
ATTORNEYS

United States Patent Office 3,539,417
Patented Nov. 10, 1970

3,539,417
SHEET TO WEB LAMINATING MACHINE
James A. Black, 13700 Sparta NW.,
Kent City, Mich. 49330
Filed Feb. 23, 1967, Ser. No. 617,890
Int. Cl. B32b 31/00
U.S. Cl. 156—522
15 Claims

ABSTRACT OF THE DISCLOSURE

Web to sheet laminating apparatus with an edge laminator combined with pressure roll laminating equipment. The pressure rolls include a smaller diameter contact roll and a floating, releasable larger diameter reinforcing roll engaging the smaller roll. A platen reinforcing roll undergirds the platen.

---

This invention relates to apparatus for laminating sheet layer materials into a laminate, and more particularly an apparatus for continuously laminating individual sheets to a continuous web, and severing the resulting laminate into individual segments in an exactly controlled manner.

In technological fields such as printing, covering of a printed surface by a protective cover sheet is frequently desirable. The application of a transparent protective film of plastic over the printing is commonly done by workmen adhering individual printed sheets on a continuous web of the protective material, rolling the composite into a large roll, then later unrolling the roll, and severing the individual portions between the spaced sheets on the web. This conventional technique, however, sometimes results in the edges of the printed sheet being subsequently employed for accurate registry of the sheet for subsequent operations such as die cutting, unless special care is taken, because the cover sheet overlaps all of the edges of the printed sheet. If one or more edges of the printed sheets is to be used for register purposes therefore, a worker must manually cut away a sufficient amount of the cover sheet to expose the printed sheet edges. This is costly, tedious, and time consuming. It will be realized that these subsequent operations such as die cutting are frequently necessary, and must have an accurate registry with respect to the printed pattern, particularly if the pattern is a complex pattern.

Consequently, high quality die cut printed items are difficult and expensive to produce according to present techniques. Similar problems also exist in related fields where laminating procedures are involved.

For purposes of convenience, hereinafter the terms "sheet" will be intended to indicate individual items which may be printed, for example, and which are to be covered with a protective layer. The term "web" will be used to designate a material in the form of a continuous web, usually fed off a roll, to be used to cover or overlie the "sheets."

It is an object of this invention to provide novel and unique equipment for laminating sheets and a web in such a manner as to enable each sheet and its corresponding overlying web segment to be delivered from the apparatus in a form completely separated from the continuous web and the other sheets.

Another object of this invention is to provide novel equipment for laminating sheets and a web in a manner that the edges of the sheets are exposed and can be used for accurate registering purposes, yet without having to cut any of the web portion away from the sheet on the laminated product. The register edges of the sheet are immediately exposed upon the formation of the laminate, due to the manner in which the laminate is formed.

Another object of this invention is to provide a unique type of sheet-to-web laminator having complete control over the positioning and feed of the web material, sheet elements, and resulting laminated elements, by the use of controlled pressure differential techniques.

Another object of this invention is to provide a sheet-to-web roll laminator having optimum laminating characteristics, applying an optimum amount of pressure over the entire width of the material on practically a line contact basis to each progressive segment.

Another object of this invention is to provide a novel sheet-to-roll laminator assembly having special control of the pressure applied to the laminating rolls, and controlled release of the pressure during non-use periods to avoid roll deformation.

Another object of this invention is to provide a sheet to web laminator that effects slitting of the web along the front and rear edges of the sheet being laminated, in an exactly controlled fashion, in a manner providing exposed front and rear register edges on the sheet, thereby eliminating the necessity for manual slitting of the materials at a subsequent time.

These and other objects of this invention will become apparent upon studying the following specification in conjunction with the drawings in which:

FIG. 5 is a sectional, enlarged, elevational view of the machine in FIG. 1 taken on plane V—V of FIG. 1;

FIG. 6 is a fragmentary sectional elevational view of the machine, taken on plane VI—VI of FIG. 7;

FIG. 7 is a fragmentary plan view of the machine;

FIG. 9 is a greatly enlarged, fragmentary, perspective view of the laminating roll and cut off assembly, viewed downwardly at an angle of about 45°;

FIG. 12 is a plan view of a portion of the laminated product prepared according to the prior art techniques; and FIG. 13 is a plan view of two of the laminated products formed according to this novel method and machine.

Figure 1:
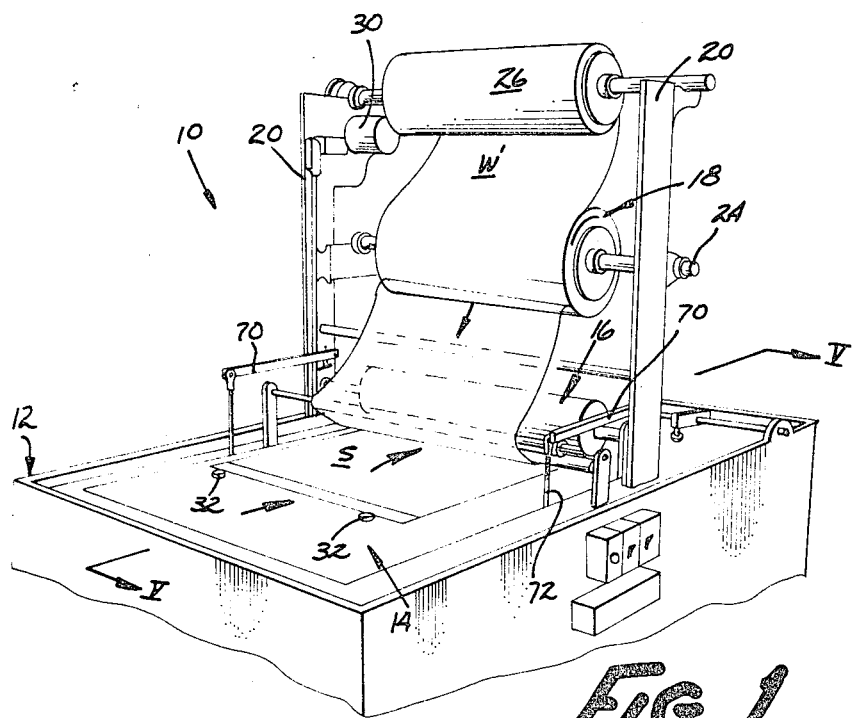
FIG. 1 is a perspective view of the infeed end of the novel sheet to web laminator.

Referring now specifically to the drawings, the complete assembly 10 includes a general support housing subassembly 12, supporting a reciprocable stock-receiving table or platen 14, pressure laminating roll subassembly 16, and web stock support and feed means 18.

The housing and framework subassembly 12 may be of any suitable type structure, shown to include an enclosure to house some of the mechanized equipment such as vacuum pumps, linkages, etc., some of which are not illustrated. Extending upwardly from opposite side edges of the middle portion of this housing framework is a pair of upright support members 20, reinforcingly tied together by tie rod 21. Elevated above the platen 14 and rotatably mounted on these support members 20 is a transverse stock-receiving shaft 24 upon which a roll of continuous web W is rotatably mounted. Since web W has one adhesive face, it has a releasable protective web W1 wound with it so that web W does not stick to itself when so wound. Mounted on top of supports 20 is a take-up roll assembly 26 for re-winding the protective web W1 as it is peeled off of and removed from roll 18. The take-up roll 26 is driven by a suitable electrical motor 30 through a friction slip clutch assembly 32, to constantly keep slack of web W1 wound thereon.

The web W is unwound from roll assembly 18 in an intermittent fashion by being pulled everytime platen 14 advances in the forward direction indicated by the arrow in FIG. 1, except that an initial amount of slack is provided in the web W in a manner and for a purpose to be described hereinafter.

Figure 8:
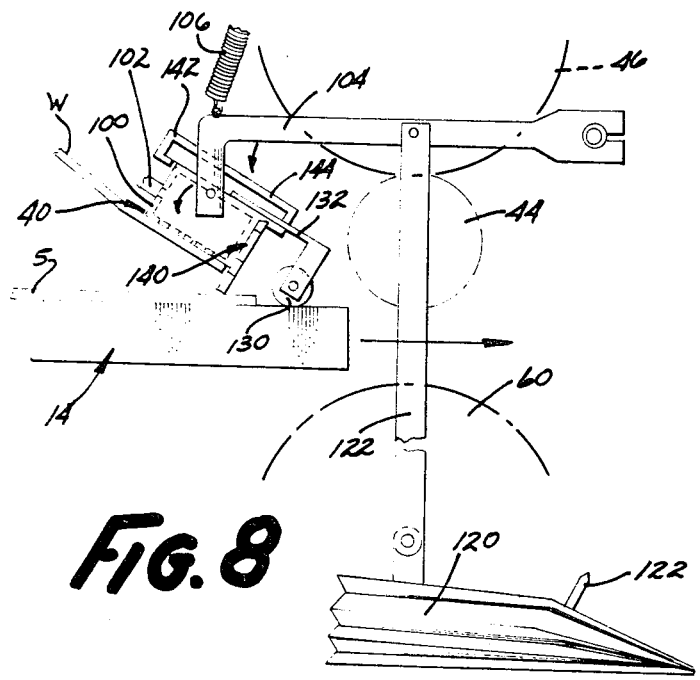
FIG. 8 is a side elevational view of the vacuum bar, edge laminator of the machine, and its actuator mechanism.

During the laminating process, portions of the continuous web W are laminated onto individual sheets S (usually printed sheets) which are initially placed upon platen 14 against stops 32. The first step in the laminating process is the adhering of the leading edge of web W against the front portion of sheet S by a vertically reciprocating vacuum bar edge laminator assembly 40 (FIG. 8). This is followed by laminating a portion of web W to the rest of the sheet by pressing them together between the forwardly advancing platen 14 and an overlying pressure roll means which includes a small diameter roll 44 having a resilient outer surface, for example of of rubber, and a larger roll 46 which engages resilient roll 44 to press the latter against the platen as it advances. The web W is guided to a position between platen 14 and roll 44 by passing around an idler roller 50 mounted on supports 52 secured to the housing (FIG. 5). Roll 44 is mounted on a pair of pivot arms 56 on its ends, and which pivot about pivot shaft 58, so that the roll can normally freely float in a riding position along the advancing reciprocable platen 14. Roll 44 applies pressure on the paten only when pressure roll 46 exerts force down upon it.

Beneath platen 14, vertically aligned beneath rolls 44 and 46, is a transverse reinforcing roll 60 which has its ends rotatably mounted in a pair of fixed bearing journals 62 (FIGS. 5 and 6). This reinforcing roll prevents the platen 14 from deflecting downwardly significantly when pressure is exerted by the pressure roll means during lamination. Mounted to the inside face of supports 20, adjacent the ends of roll 46, is a pair of vertical track type, guide means 64 for both ends of the roll 46 (FIG. 5). These guide means slidably receive the bearing journals 66 of roll 46 and enables this pair of bearing journals to vertically slide freely therein. Journals 62 of roll 60 are fixed at the lower end of these guides. A pair of compression springs 68 is positioned between each of the fixed journals 62 (FIG. 6) and the respective one of the vertically movable journals 66, to normally bias journals 66 in an upward direction. Thus, the weight of roll 36 is lifted off roll 44, to prevent this upper roll from exerting a constant pressure on the resilient roll 44 when it is not being used. This prevents the resilient roll from being permanently indented along its under and upper surfaces.

When the laminating mechanism is in use, upper pressure roll 46 is forced downwardly by a vacuum operated mechanism against resilient roll 44, to apply laminating pressure to sheets passing between roll 44 and platen 14. More specifically, referring to FIG. 5, a pair of links 70 are pivotally attached to supports 20 on one end of the links, and are pivotally attached to connecting rods 72 on their other end. Connecting rods 72 are in turn connected to bellows 74 which have a vacuum hose connection 76 to a vacuum supply such as a pump (not shown). An adjustable stop or bolt 78 extends through the links 70 adjacent their pivotal mounting to supports 20, and engages the upper edge of bearing journals 66. Hence, evacuation of bellows 74 causes connecting rods 72 to be pulled downwardly, to pivot arms 70 and thereby depress journals 66 with a substantial force, to thereby depress roll 46 to press resilient roll 44 against reciprocable platen 14. The pressure on these rolls is normally applied during the entire time that the equipment is in operation, but as soon as the equipment is shut off, the vacuum pump is deactivated, and the bellows allows the force to be removed from the upper roll, so that compression springs 68 (FIG. 6) lift the force off the resilient roll 44.

Figure 3:
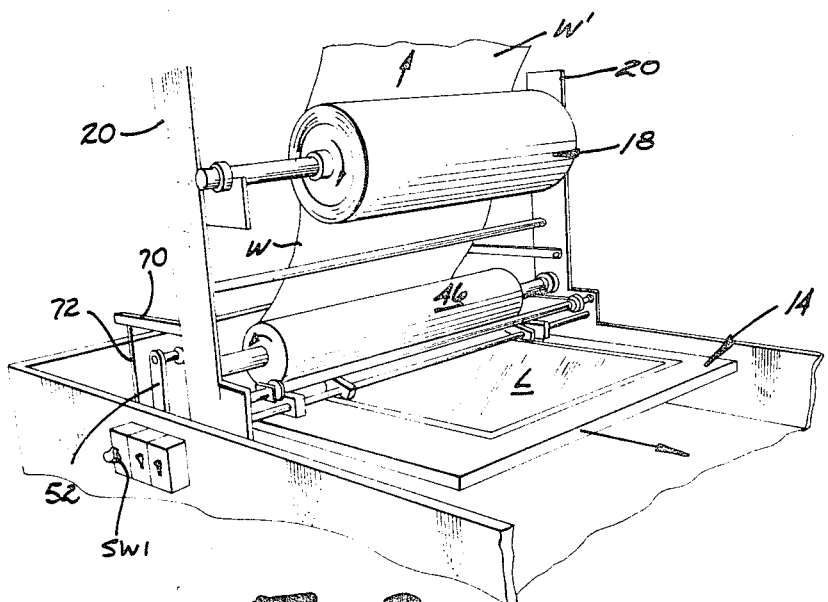
FIG. 3 is a perspective view of the output end of the machine in FIGS. 1 and 2, with a laminate being formed.
Figure 4:
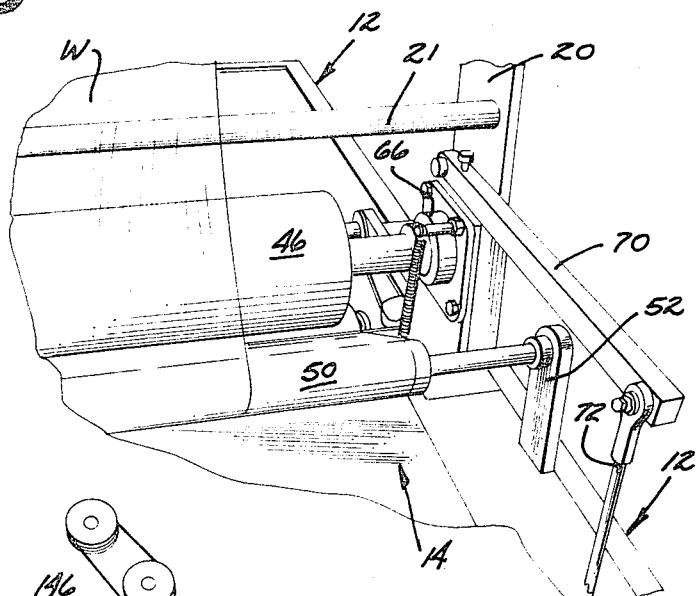
FIG. 4 is a fragmentary enlarged perspective view of a portion of the apparatus on the righthand side of the machine illustrated in FIG. 1.
Figure 11:
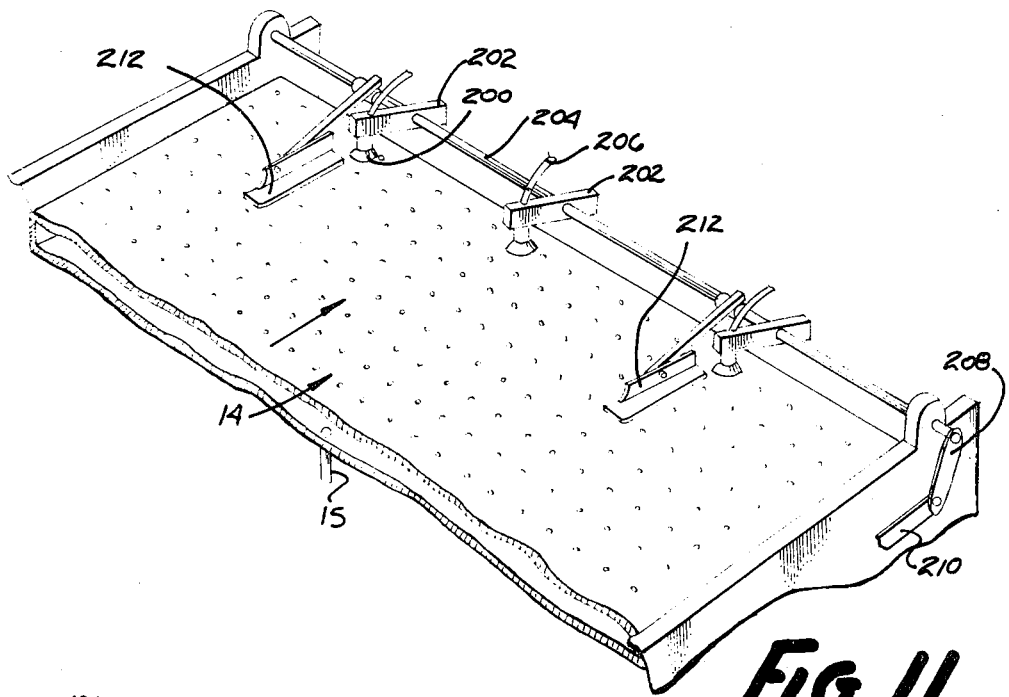
FIG. 11 is a fragmentary perspective view of the discharge end of the machine, showing the reciprocating feed table or platen at the full discharge position.

The platen 14 is reciprocated along the lengths of the machine, between its initial position illustrated in FIGS. 1 and 5, through its intermediate position illustrated for example in FIG. 3, to its extended position at the opposite or discharge end of the machine as illustrated in FIG. 11. It is moved forwardly and then returned by a pair of suitable drive chains 90 driven by sprocket means 92, and secured by connectors 94 to the underside of the platen. The sprockets are driven by a suitable reversible electrical motor (not shown) or an equivalent pneumatic or mechanical power drive means. The platen is guided on a pair of cylindrical shafts 98 around which its bearing slides 94 extend.

Platen 14 is basically rectangular shaped in plan view, having a relatively small vertical thickness, and having a hollow interior communicating to the upper surface of the platen by a large number of spaced outlet orifices 14'. These orifices are in a pattern as illustrated for example in FIG. 7. Along the forward transverse edge of the platen, the orifices are spaced more closely together to form an excellent gripping relationship on the front pulling edge of the laminate being formed. The hollow interior of this platen communicates to a vacuum pump system (not shown), via a flexible hose 15 (FIG. 5).

An important part of this laminating apparatus is the special vacuum type edge laminator bar and web cutter subassembly 40 (FIGS. 8 and 5). This subassembly includes the hollow vacuum bar 100, which extends transversely across the platen adjacent roll 44. This bar has a hollow interior, and a plurality of orifices (FIG. 8) communicating between the interior and the length of the lower surface of the bar. A vacuum connection, e.g. a flexible hose 102 communicating with a pump (not shown) is made to its interior to effect a gripping effect upon the forward edge portion of the web W (FIG. 5). This bar is pivotally mounted on its opposite ends to a pair of brackets 104, so that the bar can freely rotatably tilt to an angular position to accommodate the orientation of the web W being fed to the roll 44. The arms 104 are pivotally connected on their rearward ends to the extensions 20' of the supports 20 (FIG. 5). These arms are normally biased to their upward position on this pivotal mounting by a pair of tension springs 106. This vacuum bar adheres the front edge of the web W (FIG. 8) against the forward portion of a sheet S by pressing the edges together. This can be done by lowering the vacuum bar using the linkage illustrated in FIG. 8. More specifically, by contracting the bellows 120, by vacuum through connection 123, the links 122 can be pulled down to thereby pivot the arms 102 downwardly against the spring bias, lowering the vacuum bar 100 toward the platen 14 and thus lowering the forward edge of web W clinging to the bar, toward the forward edge of sheet S. As the vacuum bar is lowered, the wheel 130 connected by bracket 132 to the vacuum bar pivots the vacuum bar so that its underside assumes a horizontal orientation co-planar with platen 14. Although in FIG. 8 it appears that the cutter unit 140, which projects downwardly below the lower edge of the vacuum bar, would interfere with this action, actually this cutter is normally positioned at one end of the bar and off to one side of the platen 14. It only reciprocates transversely across the platen when the vacuum bar is in its elevated position as described hereinafter. Thus, at the initiation of the laminating operation, the forward edge of the web W is held tightly against the lower edge of the vacuum bar by the pressure differential, and is accurately lowered against the sheet S. Actually, by controlling the position of the sheet with respect to the bar, the forward edge of the sheet remains exposed for registry purposes on subsequent operations. Since the web has a pressure sensitive adhesive on its underside, which was protected by the removable web W', the pressing of the edges together causes the edges to laminate. During this edge lamination, and thereafter, sheet S is retained tightly against the platen 14 by the vacuum applied to this platen. As soon as this edge area is laminated, the vacuum is released from the vacuum bar, to release the web, and from its bellows 120 to allow it to rise, and it is raised to its elevated position illustrated in FIG. 8. Platen 14 can then advance in the direction indicated by the arrow in FIG. 8. The advancement of the evacuated platen carries sheet S along with it, and, due to the laminated edge condition at the forward edge of the web, pulls the web from its stock roll, to advance the two materials between the pressure roll assembly illustrated in phantom in FIG. 8. After the table has advanced to a condition where the rear edge of the portion of the sheet S is approaching the pressure rolls, the table stops momentarily so that the web W which has been riding over the lower surface of the vacuum bar can be cut on cutter unit subassembly 140. This is done by reciprocating the cutter unit 140 across the edge of the vacuum bar from one side of the machine to the other, and then return. At the same time, the vacuum bar is re-evacuated so as to tightly retain the resulting leading edge of the severed web for the next lamination. The table is then advanced a few inches more to laminate the remaining tail portion of the slit web and the remaining portion of the sheet.

Figure 10:
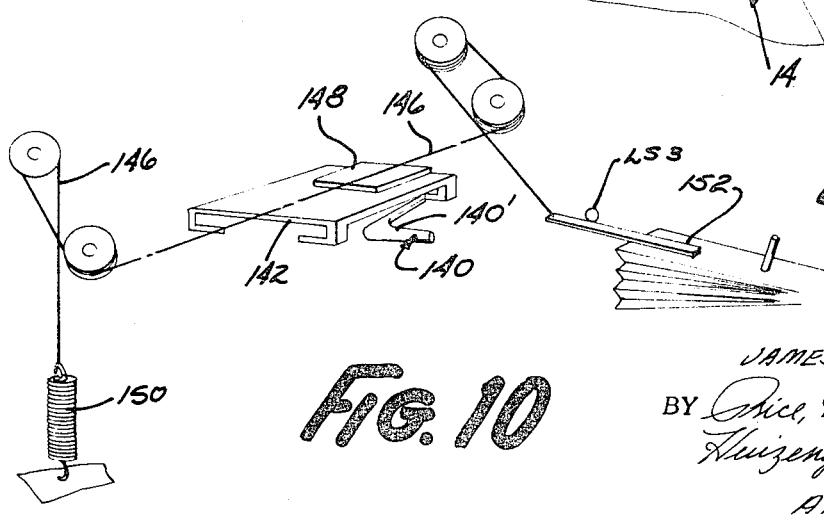
FIG. 10 is a perspective schematic view of the cut off unit and its actuator mechanism.

The cutting element 140' of cutter subassembly 140 is a generally V-shaped element (FIG. 10) which is mounted to a reciprocating cutter mount 142. This mount 142 fits around a transverse, elongated guide plate 144 (FIG. 8) that is mounted in overlapping fashion to the top of the vacuum bar so that the mount can be slid from end to end on it. Power is applied to this mount and cutter to slide it by securing a cable 146 to a connector 148 on the top of the mount 142. This cable passes around suitable pulleys (FIG. 10) on its opposite ends, with a tension spring 150 biasing it in one direction, and a vacuum operated bellows unit 152 biasing it in the opposite direction against the force of the spring. The cutter 140' extends down alongside the forward face of the vacuum bar. It severs the web as it reciprocates along the vacuum bar. The leading edge of the web overlaps the bottom face of the bar after being cut off, so that, by having vacuum applied to the bar during cutting, the front edge of the web is under complete control.

After the lamination is complete, and the platen has reached its furthest position, it is reversed to return to its initial position illustrated in FIG. 5. As it reaches its initial positon, the platen causes the stock roll 18 to unroll a small amount of slack web W so that, when the vacuum bar then lowers agan toward the platen, the web front edge will not pull free of the vacuum bar. It will be realized that if the web W were completely taut, as the vacuum bar lowers, this web might have a tendency to pull free from the vacuum bar. The slackness of the web is obtained by the apparatus illustrated in FIG. 5.

Figure 2:
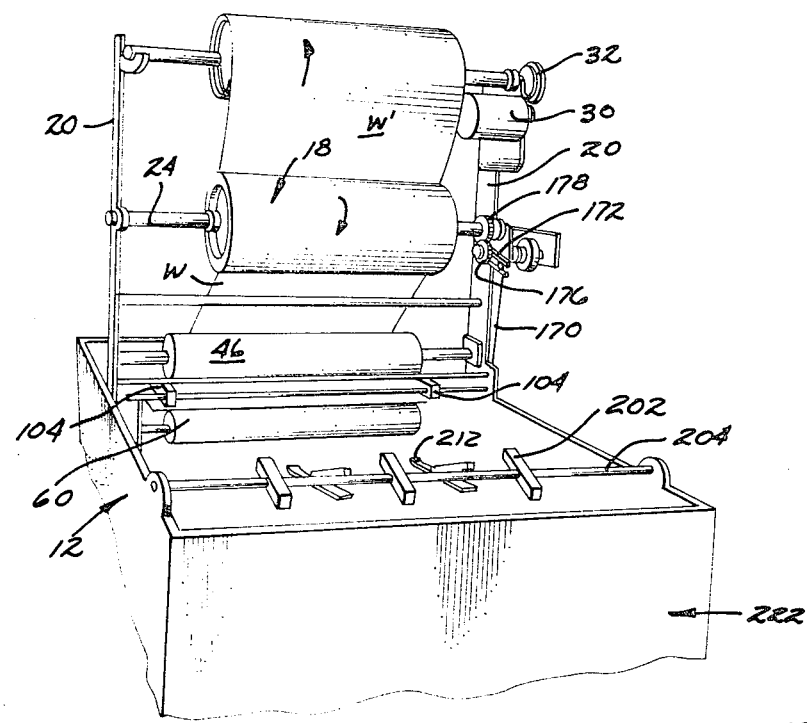
FIG. 2 is a perspective view of the output end of the machine in FIG. 1.

More specifically, mounted to the underside of the platen 14 is a bracket 160 which strikes a stop 162 on a lever 164. Lever 164 is pivotally mounted at its center to the framework 12 to pivot and thus shift the rod 166 along its length. This rod is attached to a bell crank 168, which converts the horizontal movement of rod 166 to vertical movement of rod 170. The upper end of rod 170 is pivotally connected in a slide connection to radius arm 172 which rotates a one-way clutch 174 to thereby rotate a spur gear 176. Referring to FIG. 2, this spur gear 176, engaged with another spur gear 178 on the shaft 24 of roll 18, causes the roll to be rotated a few degrees to create the slack in the web W. As the table then subsequently moves in the opposite direction, the linkage is allowed to move back to its initial position by weight of arm 172, without rotating of the roll in the opposite direction, due to the one-way clutch 174.

The laminated products are removed from the platen when it is in its far position, by a plurality of sucker elements 200 (FIG. 11) which are in turn mounted to supports 202 on pivot shaft 204. A vacuum hose connection 206 is made to each of the suckers, so that, when the shaft 204 is pivoted by links 208 and 210, vacuum can be applied to the upper surface of the laminate. In order to make sure that the platen still does not retain the laminate by its vacuum hold, the vacuum on the platen is purposely released prior to the platen reaching the furthest position beneath the suckers. In order to prevent the edges of the laminate from possibly curling slightly when the table vacuum is released prior to the table reaching its far position, which curling would prevent the suckers from getting a good grip after the release of the table vacuum, a pair of hold-down members 212 are mounted to the bar 204 for pressing the leading edge of the laminate against the platen until the suckers can get a grip on it. Then, as the platen is reversed back to its initial position, the suckers retain the laminate, to slide the laminate off the top of the table. Then, by release of the vacuum on the suckers, the laminates can be dropped into a suitable storage area 222 (FIG. 2) on the discharge end of the assembly.

In operation of this novel assembly, the roll of web and its attached, removable protective web sheet W' is mounted on supports 20 in the position 18 illustrated in FIG. 1. The leading edge of the web W is pulled down into an interengagement with the underside of the vacuum bar 100, and vacuum is applied to this bar to grip the edge of the web. The leading edge of the protective web W' is engaged with the roll 26 so that it will be wound up continuously. A sheet S to be laminated is then placed on the table and pulled back against suitable stops 32 (FIG. 1) so that the forward edge of the sheet S projects slightly beyond the forward edge of the web W as illustrated in FIG. 8. Then, vacuum is applied to the platen or table 14 to retain this sheet in position. Next the bellows 120 (FIG. 8) are actuated to lower the vacuum bar and its attached web edge down into engagement with the sheet S for causing the pressure adhesive to secure these front edges together. (The sheet edge is positioned to project beyond the lowered edge of the web so that the sheet edge can subsequently be used for registering purposes on subsequent operations.) Then, vacuum is released from the vacuum bar, and the vacuum bar is again raised. Next, the platen 14 is advanced between the pressure rolls 44, 46 and 60. Practically a line contact is made between the small diameter pressure roll 44 and the platen. This line contact is very effective in achieving an optimum lamination without air bubbles, particularly because this small diameter pressure roll has a resilient surface on its outer periphery. Since this small diameter roll would tend to flex undesirably if it were used alone, a large diameter roll 46 is engaged against its upper periphery to apply restraining force from deflection. The force applied downwardly on the upper roll 46 is achieved by evacuation of the bellows 74 (FIG. 5) to put force down upon the bearings of the pressure roll. The underlying roll 60 prevents the relatively thin and hollow platen from being deflected downwardly as pressure is applied to the laminate.

After the sheet S is almost completely laminated, and its tail edge is approaching the laminating rolls, the table is momentarily stopped, and the cutter 140 is reciprocated across the edge of the vacuum bar to sever the tail edge of the web W at the forward face of the vacuum bar. This is done at a platen position such that the tail end of the web will fall short of coinciding with the tail end of the sheet S. Therefore, the rear edge of the sheet S will also be available for subsequent registry purposes. Vacuum is applied to the vacuum bar 100 again just prior to cutting of this web in order to secure the newly formed leading edge of the web for the next operation. The table is then advanced again a short amount in order to completely laminate the tail edges of the sheet and web portion by pulling them through the rolls. Just prior to the platen reaching its far position, its vacuum is released so that the negative pressure in the platen will be dissipated by the time that it reaches the end. The forward edge of the laminate is prevented from curling after vacuum is released from the table by the hold down slide shoes 212 (FIG. 11). As the table reaches its end position, the suckers illustrated in FIG. 11 are reciprocated down into engagement with the laminate to hold it while the table then reverses. As the table reaches its initial position, it causes an initial amount of slack to occur in the web W by the linkage shown in FIG. 5 causing the web roll to unroll a small amount.

As the operation is then constantly repeated after this initial start up, it is automatically controlled through this sequence. This can be done by a suitable set of limit switches to control the operations. That is, the machine is activated by depressing a suitable control switch SW1 (FIG. 3) which actuates the vacuum pump means (not shown) and activates a cycle control timer that activates the platen vacuum and the edge laminator bar vacuum. The timer then activates the vacuum supply to the bar shifting bellows 120. As the bar presses the edges together, the timer releases the bar vacuum, and then starts the table advance. As the table advances to the point where the tail edge of the sheet S approaches the rolls, switch operator O on the table (FIG. 7) strikes limit switch LS1 to shut the table vacuum off and reactivate the bar vacuum. Then operator O strikes limit switch LS2 to temporarily stop the table and actuate the cut off knife. Upon return of the cut off unit, limit switch LS3 (FIG. 10) operated by lever 151 on bellows 152 reactivates table advance. Operator O then strikes switch LS4 to shut off table vacuum and actuate pick off sucker vacuum. Contact of operator O with return limit switch LS5 then reverses the table to cause cycle to repeat. By the varying of the position of these limit switches, the stroke of the platen can be varied also to accommodate the particular stock size.

Referring to FIGS. 12 and 13, some of the results of the improved operation are shown. In the prior art, when printed sheets S (FIG. 12) were covered with a protective material, even if the protective web W was aligned so that the side edges of the sheets were exposed for registry purposes, the front and rear edges were not. That is, when the web was subsequently manually slit along the phantom slit lines shown, the front and rear edges of the sheets would not be available for registry purposes since the web portions would overlap them considerably. These materials could only be removed to expose these edges for registry purposes by careful tedious manual operations. The laminates L formed by the novel method and apparatus (FIG. 13) have all edges of the printed sheet exposed for possible use for registry purposes on subsequent operations such as die cutting, even though manual operation is not required to form or sever the laminates. Furthermore, the operation is rapid, almost completely automatic except for optionally manually loading of the individual sheets on the platen, and is completely reliable. It has shown in actual operation that the laminating procedure can be very rapidly performed with a minimum of attention. These and additional advantages will be readily apparent to those having ordinary skill in the art. It is also conceivable that certain minor variations in construction might be made by those in the art to suit a particular type of situation.

I claim:

1. A sheet to web laminating machine comprising: support structure; a sheet supporting, retaining, and advancing platen movably supported on said support structure; platen shifting means to shift the platen in a direction between a first position and a second position; pressure roll means adjacent said platen and oriented transverse of said direction to press a sheet and a web together to laminate them with platen shifting; and an elongated web edge holding, positioning, and laminating means adjacent to and parallel to said pressure roll means and said platen, shiftably mounted to said support structure to shift from a first web edge holding position spaced from said platen to a second edge laminating position against said platen to press the leading edge of a web against a sheet on said platen prior to shifting of said platen to laminate the rest of said sheet to said web, said edge holding, positioning, and laminating means being a vacuum bar having orifices oriented generally toward said platen and having internal passageway means communicating with said orifices and adapted to communicate with evacuation means.

2. The machine in claim 1 wherein said sheet retention means includes a series of orifices in said platen and passageway means in said platen communicating with said series of orifices and adapted to communicate with evacuation means.

3. The machine in claim 1 wherein said pressure roll means comprises a relatively smaller diameter sheet engaging roll adjacent said platen, and a relatively larger diameter reinforcing roll in engagement with and parallel to said smaller diameter roll opposite said platen.

4. The machine in claim 1 wherein said pressure roll means comprises a relatively smaller diameter engaging roll adjacent said platen, and a relatively larger diameter reinforcing roll in engagement with and parallel to said smaller diameter roll opposite said platen; said smaller diameter roll being freely rotatably suspended in bearings to be shiftable toward and away from said platen; said larger diameter roll being freely rotatably suspended in bearings, to be shiftable toward and away from said smaller diameter roll; and releasable pressure applicator means operably associated with said larger diameter roll bearings to bias said larger diameter roll toward said smaller diameter roll and thus said smaller diameter roll toward a sheet and web on said platen.

5. The machine in claim 4 wherein said releasable pressure applicator means includes shiftable depressor means engaging said larger roll bearings, and pressure differential actuating means operably connected to said depressor means to actuate and release said depressor means.

6. The machine in claim 1 wherein said vacuum bar has a platen engageable camming means for pivoting the vacuum bar from its tilted orientation to its platen matching orientation.

7. A sheet to web laminating machine comprising: support structure; a sheet supporting, retaining, and advancing platen movably supported on said support structure; platen shifting means to shift the platen in a direction between a first position and a second position; pressure roll means adjacent said platen and oriented transverse of said direction to press a sheet and a web together to laminate them with platen shifting; and an elongated web edge holding, positioning, and laminating means adjacent to and parallel to said pressure roll means and said platen, shiftably mounted to said support structure to shift from a first web edge holding position spaced from said platen to a second edge laminating position against said platen to press the leading edge of a web against a sheet on said platen prior to shifting of said platen to laminate the rest of said sheet to said web, a platen-reinforcing roll rotatably mounted to said support structure, and engagingly undergirding said platen opposite said pressure roll means.

8. A laminating machine comprising: a layer supporting and retaining platen having a support surface with a plurality of orifices and passage means communicable from said orifices to evacuation means; pressure applicator means; said platen being reciprocable beneath said pressure applicator means to laminate from an initial position; and edge laminating means adjacent said pressure applicator means shiftable toward said platen to laminate the leading edges of a layer retained on said support surface and another layer on said first layer to enable said platen to advance both layers past said pressure applicator means; said edge laminating means comprising: a vacuum bar having a layer engaging surface area, and being pivotally mounted to enable pivoting thereof for optimum contact with the layer and said platen.

9. The machine in claim 8 including web guide means to said pressure applicator means to enable a continuous web to comprise the top layer to be laminated; and including cut off means on said edge laminating means to enable severance from the web of a web section being laminated; said edge laminating means comprises an elongated vacuum bar shiftable from a first web edge holding position away from said platen to a second edge laminating position on said platen; said cut off means includes an elongated guide extending along said vacuum bar, a cut off element movably mounted on said guide to traverse it, and propelling means attached to said cut off element; said vacuum bar is supported by shiftable mounting means operably connected to shifting power bellows.

10. The machine in claim 9 wherein said propelling means is operably associated with shifting power bellows.

11. The machine in claim 8 including web roll support means and roll rotating means therefor, said roll rotating means being operably associated with said platen when said platen is at its initial position, to initially create a controlled amount of web slack to enable said edge laminating means to shift the web to said platen.

12. A laminating machine comprising a pressure roll means and a shiftable stock holding, supporting, and advancing platen means shiftable past said pressure roll means; said pressure roll means including a first relatively small diameter stock engaging roll vertically movably mounted, a second relatively larger diameter pressing roll vertically movably mounted in engagement with said first roll; and releasable force applicator means for said second roll to enable said second roll to force and restrain said first roll against said platen.

13. The machine in claim 12 wherein said second roll has roll mounting journals guided by vertical guide means; biasing means applying a biasing force tending to disengage said second roll from said first roll.

14. The machine in claim 13 wherein said force applicator means comprises pressure differential means.

15. The machine in claim 13 wherein said force applicator means comprises a lever means operably connected to a vacuum operated power bellows.

References Cited

UNITED STATES PATENTS

| | | | |
|---|---|---|---|
| 2,625,287 | 1/1953 | Holt et al. | 156—522 X |
| 2,787,941 | 4/1957 | Aldrich et al. | 156—522 X |
| 2,818,908 | 1/1958 | Byrnes et al. | 156—522 |
| 3,099,026 | 7/1963 | Reid et al. | 156—522 X |
| 3,152,945 | 10/1964 | Jackson | 156—522 |
| 3,367,822 | 2/1968 | Hoffler | 156—297 X |
| 3,384,523 | 5/1968 | Bender | 156—522 |

ROBERT F. STAHL, Primary Examiner

U.S. Cl. X.R.

156—297, 556